United States Patent
Yamatani (10) Patent No.: US 7,269,447 B2
(45) Date of Patent: Sep. 11, 2007

(54) PORTABLE TELEPHONE TERMINAL AND POWER SUPPLY METHOD

(75) Inventor: Wataru Yamatani, Chiba (JP)

(73) Assignee: Sony Corporation (JP)

( * ) Notice: Subject to any disclaimer, the term of this patent is extended or adjusted under 35 U.S.C. 154(b) by 1010 days.

(21) Appl. No.: 09/934,426

(22) Filed: Aug. 21, 2001

(65) Prior Publication Data

US 2002/0052227 A1     May 2, 2002

(30) Foreign Application Priority Data

Aug. 22, 2000    (JP) ................. P2000-251101

(51) Int. Cl.
 *H04B 1/38* (2006.01)
(52) U.S. Cl. .................. 455/574; 455/343.1; 307/18; 307/43
(58) Field of Classification Search ................ 455/571, 455/572, 573, 574, 343.1, 343.2, 343.6, 343.4, 455/34.6; 320/138, 107, 133; 307/66, 18, 307/43, 64
See application file for complete search history.

(56) References Cited

U.S. PATENT DOCUMENTS

| | | | | |
|---|---|---|---|---|
| 5,117,449 | A * | 5/1992 | Metroka et al. | 455/552.1 |
| 5,335,263 | A * | 8/1994 | Tsunehiro et al. | 455/572 |
| 5,420,576 | A * | 5/1995 | Matai et al. | 340/7.43 |
| 5,438,696 | A * | 8/1995 | Napoles | 455/343.6 |
| 5,701,597 | A * | 12/1997 | Nakanishi et al. | 455/127.1 |
| 5,834,857 | A * | 11/1998 | Abe et al. | 307/66 |
| 6,223,025 | B1 * | 4/2001 | Tsukuda | 340/7.37 |
| 6,374,127 | B1 * | 4/2002 | Park | 455/572 |
| 2001/0017485 | A1 * | 8/2001 | Yoo | 307/66 |
| 2002/0006814 | A1 * | 1/2002 | Fukunishi | 455/572 |
| 2002/0028700 | A1 * | 3/2002 | Kato | 455/572 |
| 2002/0028701 | A1 * | 3/2002 | Satoh et al. | 455/574 |
| 2002/0128051 | A1 * | 9/2002 | Liebenow | 455/574 |
| 2003/0087682 | A1 * | 5/2003 | Cathey et al. | 455/574 |

FOREIGN PATENT DOCUMENTS

EP     98120284    10/1998

* cited by examiner

*Primary Examiner*—Fan Tsang
*Assistant Examiner*—Olisa Anwah
(74) *Attorney, Agent, or Firm*—Lerner, David, Littenberg, Krumholz & Mentlik, LLP

(57) ABSTRACT

A portable telephone terminal where power is supplied from a series power supply when the portable telephone terminal is in a wait state or a state where processors and the like are not in full operation. When the processors and the like are in a busy operating condition, power is supplied from a DC/DC converter. While the series power supply supplies power, operation of the DC/DC converter is stopped.

9 Claims, 5 Drawing Sheets

PORTABLE TELEPHONE TERMINAL AND POWER SUPPLY METHOD

BACKGROUND OF THE INVENTION

The present invention relates to a portable telephone terminal and a power supply method that can effectively utilize electric energy of a power supply (battery) incorporated in the terminal.

As a result of recent progress of semiconductor fabrication processes, especially microfabrication techniques, processors and the like typifying a digital integrated circuit (IC) as a semiconductor device have been increasingly scaled down, and their minimum line width becomes narrower each year. With this trend for finer lines, operating voltage of the device itself is being lowered. Devices used in a digital system of a portable telephone terminal are no exception; portable telephone terminals employ microprocessors, signal processors and the like that operate on low voltage.

On the other hand, an analog system of a portable telephone terminal uses electronic devices typified by a transmission amplifier and an analog IC. In order to maximize performance of circuits in the analog system, the analog system effectively utilizes the maximum voltage of a battery incorporated in the telephone terminal. On the other hand, a device in a power supply system typified by a power-conserving control IC for optimally controlling power to each device is required to have an absolute withstand voltage such that the device can satisfactorily withstand the maximum voltage of the battery.

Thus, devices that operate on a voltage lower than the battery voltage and devices that operate using the battery voltage as it is are mixed in a portable telephone terminal. A so-called series power supply (constant-voltage power supply) is used as a source of low-voltage power supply to lower the battery voltage to a desired voltage level and supply the low voltage to specified circuits.

However, when the series power supply (series regulator) is used to supply the low voltage to devices of the portable telephone terminal, power loss occurs as the series power supply operates to supply the low voltage (constant voltage) because of characteristics of the series power supply. This indicates that the series power supply serving as the source of power supply consumes power that is intended to be supplied to IC and other devices. Thus, there is a problem in that electric energy possessed by the power supply (for example a lithium battery) is not effectively utilized.

In addition, there are not a few cases where the series power supply in the process of making the voltage constant consumes more power as heat than is consumed by the devices in the portable telephone terminal, depending on the conditions in which the series power supply is used.

Furthermore, as the portable telephone terminal itself is reduced in size, packaging density of parts used in the portable telephone terminal is increased. This makes it increasingly difficult to make thermal design to release heat generated by the series power supply to the outside of the portable telephone terminal.

SUMMARY OF THE INVENTION

The present invention has been made in view of the above problems. It is accordingly an object of the present invention to provide a portable telephone terminal and a power supply method that can effectively utilize a battery serving as a power supply in power management of the portable telephone terminal and thereby reduce consumption of the battery.

It is another object of the present invention to provide a portable telephone terminal and a power supply method that reduce generation of heat in the whole of the portable telephone terminal including a power supply unit and thereby make it easier to make thermal design including measures to radiate heat.

In order to achieve the above objects, according to an aspect of the present invention, there is provided a portable telephone terminal having a load portion, whose power consumption varies according to status of operation of the portable telephone terminal, the portable telephone terminal comprising: a first power supply circuit; a second power supply circuit; a determining circuit for determining the status of operation of the portable telephone terminal; and a control circuit for effecting control according to the determined status of operation to switch between a first power supply mode in which the first power supply circuit supplies power to the load portion and a second power supply mode in which the second power supply circuit supplies power to the load portion.

According to another aspect of the present invention, there is provided a power supply method for a portable telephone terminal, the portable telephone terminal having a first power supply circuit, a second power supply circuit, and a load portion whose power consumption varies according to status of operation of the portable telephone terminal, the power supply method comprising the steps of: determining the status of operation; and switching, according to the determined status of operation, between a first power supply mode in which the first power supply circuit supplies power to the load portion and a second power supply mode in which the second power supply circuit supplies power to the load portion.

DESCRIPTION OF THE PREFERRED EMBODIMENT

Figure 1:
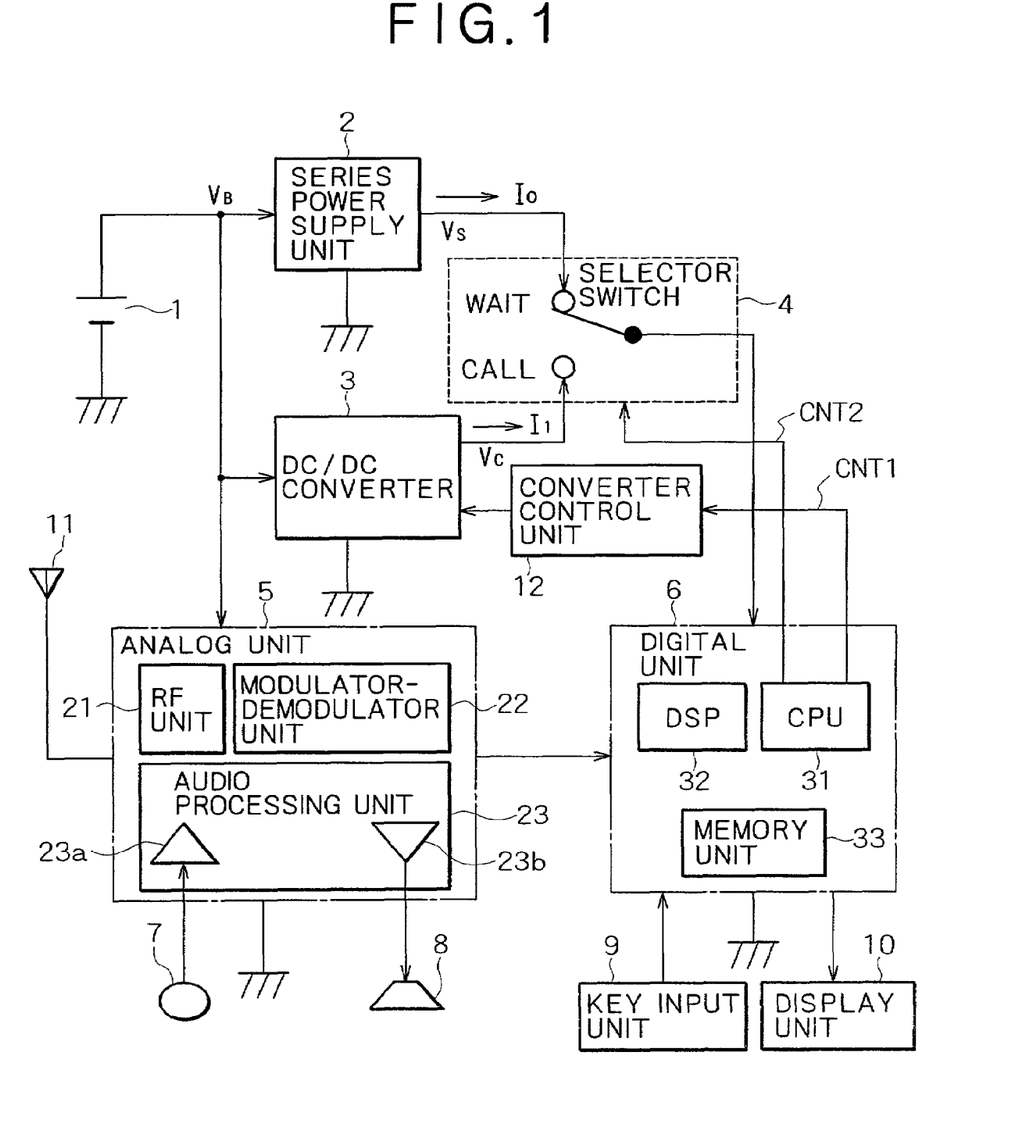
FIG. 1 is a block diagram showing a configuration of a portable telephone terminal according to an embodiment of the present invention.

A preferred embodiment of the present invention will hereinafter be described in detail with reference to the accompanying drawings. FIG. 1 is a block diagram showing a configuration of a portable telephone terminal according to the present embodiment. The portable telephone terminal shown in the figure has a battery 1 serving as a unit for supplying operating power of the terminal (for example a lithium-ion battery having an output voltage $V_B$ of 3.6 V). The battery 1 is connected with a series power supply unit 2 and a DC/DC converter 3. The battery 1 directly supplies power to an analog unit 5. Power is also supplied from the series power supply unit 2 or the DC/DC converter 3 to a digital unit 6 via a selector switch (SW) 4, which forms a power supply path according to switch selection processing to be described later.

The series power supply unit 2 converts the direct-current output voltage $V_B$ (3.6 V) of the battery 1 to a direct-current voltage $V_S$=1.2 V. The DC/DC converter 3 also converts the direct-current output voltage $V_B$=3.6 V of the battery 1 to a direct-current voltage $V_C$=1.2 V.

The analog unit 5 includes: an RF unit 21 for handling a signal in a radio frequency band transmitted or received via an antenna unit 11; a modulator-demodulator unit 22 for subjecting a transmission signal to a specified modulation or performing demodulation processing to extract a desired signal from a received signal; and an audio processing unit 23 for processing audio signals for a telephone call. The audio processing unit 23 for example has an amplifier 23a for amplifying an audio signal inputted from a microphone 7 and a power amplifier 23b for amplifying a received audio signal to an audible level and then outputting the voice from a speaker (ear receiver) 8.

Thus, the analog unit 5 is a part that involves a call by voice and the like. Accordingly, in order to secure a dynamic range of audio signals and thereby maintain specified performance, the analog unit 5 needs to be provided with a high supply voltage. Therefore, power is often directly supplied from the battery 1 to the analog unit 5, as shown in FIG. 1.

The digital unit 6 comprises: a central processing unit (CPU) 31 for effecting control of the whole of the portable telephone terminal including the switch selection processing to be described later; a digital signal processor (DSP) 32 for processing various digital signals related to transmission and reception; and a memory unit 33 for providing a memory area for registering telephone numbers, a work area used by the CPU 31 to perform processing, and the like.

In addition, the digital unit 6 is connected with a key input unit 9 for dial input by the user and the like and a display unit 10 formed by for example a large LCD (liquid crystal display) for displaying received information and a control screen.

The power supply switching processing of the portable telephone terminal according to the present embodiment will be described with reference to a flowchart and a timing chart.

Figure 2:
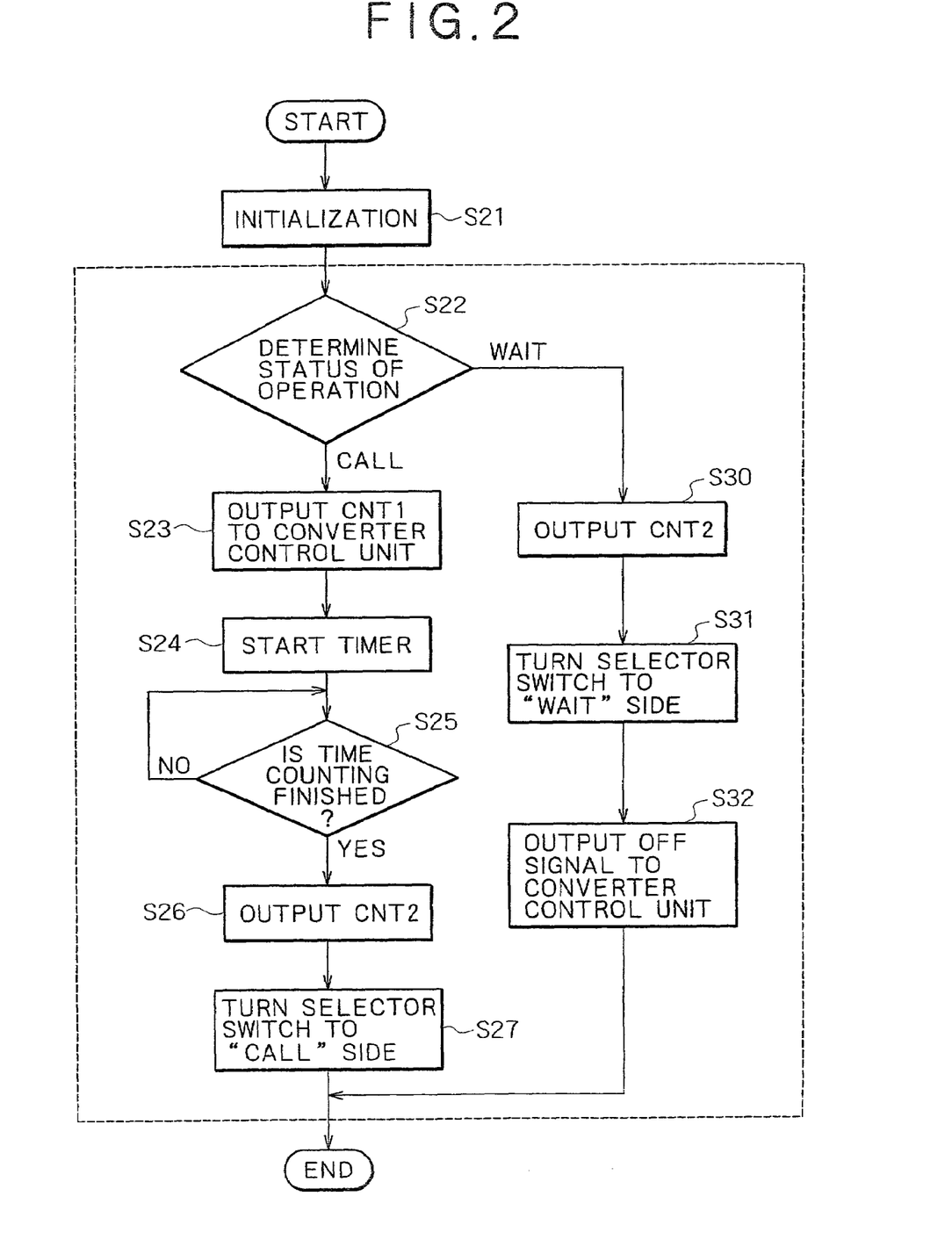
FIG. 2 is a flowchart illustrating power supply switching processing of the portable telephone terminal according to the embodiment.
Figure 3:
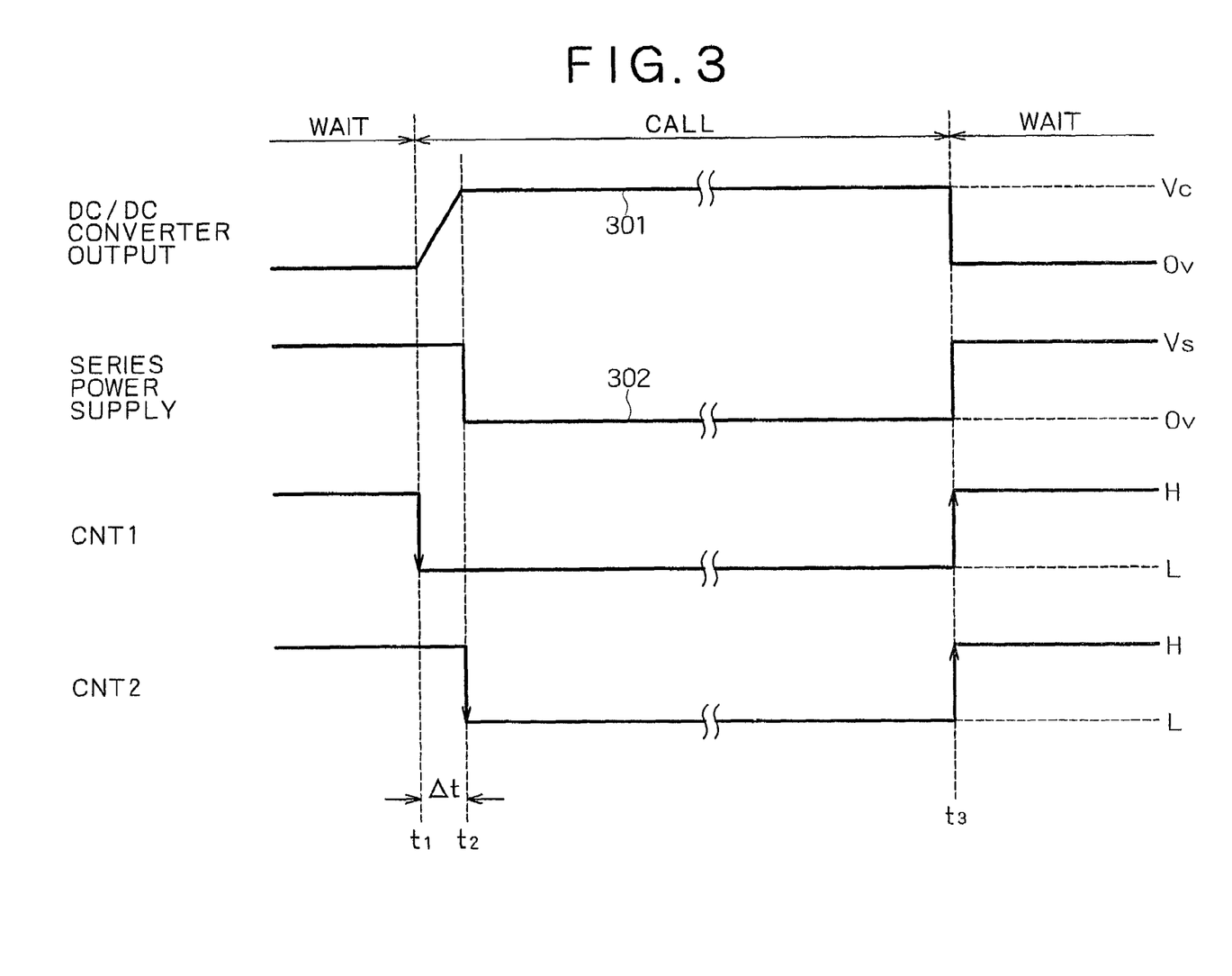
FIG. 3 is a timing chart illustrating a relation between control signals and power supply outputs in switching the power supply.

FIG. 2 is a flowchart illustrating the power supply switching processing of the portable telephone terminal according to the present embodiment. FIG. 3 is a timing chart illustrating a relation between control signals and power supply outputs in switching the power supply.

When the power is turned on by operation of a power supply switch of the portable telephone terminal or the like, the telephone terminal is initialized at a step S21 in FIG. 2. At the next step S22, the CPU 31 monitors and determines a status of operation. The "status of operation" in this case designates a state of waiting for communication (hereinafter referred to as a wait state) or the other state (referring to a state of key operation being performed and a call and other operating states, and hereinafter referred to simply as a call state).

When the CPU 31 determines that the portable telephone terminal is in a "call" state, the processors such as the CPU 31 and the DSP 32 in the portable telephone terminal enter a busy operating state (in other words, a full operation state or the like) as compared with a previous "wait" state. Therefore, the CPU 31 effects control to switch the source of power supply to the digital unit 6 from the series power supply unit 2 to the DC/DC converter 3.

The series power supply requires a certain difference in voltage between the input and output for its circuit operation (the series power supply does not operate without a voltage difference of a certain value or higher between the input and output). When the series power supply lowers the input voltage (when the series power supply makes the input voltage constant), the series power supply performs an operation practically corresponding to the flowing of a current through a series (variable) resistor. Accordingly, a power loss inevitably occurs.

In view of such a problem, in order to avoid the power loss, the portable telephone terminal according to the present embodiment effects control to switch from the series power supply to the power supply with no power loss when a power supply load requires a great current (when the processors are in a busy operating state, as described above).

Thus, at a step S23, the CPU 31 outputs a control signal CNT1 to a converter control unit 12 (see FIG. 1) in timing t1 shown in FIG. 3. More specifically, the CPU 31 changes the CNT1 signal from a logic "H" to an "L". The converter control unit 12 effects ON/OFF control of the DC/DC converter 3. In response to the CNT1 signal from the CPU 31 changing from the logic "H" to the logic "L", the converter control unit 12 functions to activate the DC/DC converter 3, which has been in a non-operating state.

The CPU 31 activates a timer in the timing t1 (step S24 in FIG. 2), and determines whether a specified time ($\Delta t$ as shown in FIG. 3 in this case) has passed at the next step S25. Then, in order to stop power supply from the series power supply unit 2, the CPU 31 outputs a control signal CNT2 changing from a logic "H" to an "L" to the selector SW 4 in timing t2 after a passage of $\Delta t$ from the timing t1 (step S26).

In response to the control signal CNT2, the selector SW 4 changes its switch position to a "call" side shown in FIG. 1 (step S27). As a result, the power supply output $V_S$ from the series power supply unit 2 is not applied to the digital unit 6 during the call, and the voltage $V_S$ applied to the digital unit 6 becomes 0 V, as indicated by reference numeral 302 in FIG. 3. In the meantime, the power supply output $V_C$ from the DC/DC converter 3 is supplied to the digital unit 6, as indicated by reference numeral 301 in FIG. 3.

When the source of power supply to the digital unit 6 is switched from the series power supply unit 2 to the DC/DC converter 3, the delay time $\Delta t$ is provided because the circuit operation (self-excited or externally excited, for example) of the DC/DC converter 3 generally requires a certain rise time before the DC/DC converter 3 outputs a certain level of voltage. Thus, the present embodiment turns the selector SW 4 to stop power supply from the series power supply unit 2 in the timing t2 after a passage of $\Delta t$ from the timing t1, or after the DC/DC converter 3 is fully activated, as shown in FIG. 3. This processing makes it possible to avoid instantaneous interruption of power supply at the time of switching.

On the other hand, when the CPU 31 determines that the portable telephone terminal is in a "wait" state at the step S22, the CPU 31 changes the control signal CNT2 from the logic "L" to the "H" at a step S30, and changes the switch position of the selector SW 4 to a "wait" side at a step S31 (timing t3 in FIG. 3). At the next step S32, the CPU 31 outputs a CNT1 signal for stopping the operation of the DC/DC converter 3 (an OFF signal changing from the logic "L" to the "H" in this case) to the converter control unit 12.

After the control described above, the portable telephone terminal is switched to a wait power supply state. Therefore, the DC/DC converter 3 stops operating, and the series power supply unit 2 becomes the source of power supply to the digital unit 6 formed by the processors such as the CPU and other digital circuits. Thus, during the wait, the digital unit 6 is supplied with the power supply output $V_S$ from the series power supply unit 2, whereas the power supply output $V_C$ from the DC/DC converter 3 becomes $V_C=0$ V, as shown in FIG. 3.

Such control is effected so as not to operate the DC/DC converter 3 at all times during a wait because the operation of the DC/DC converter 3 under no-load conditions causes internal power loss. Thus, in a wait state or a state in which the processors and the like are not in full operation, the portable telephone terminal stops the DC/DC converter 3 to thereby prevent unnecessary power consumption by idling operation of an internal circuit of the DC/DC converter 3.

As described above, during a wait, the portable telephone terminal does not operate the DC/DC converter and uses the series power supply as the source of power supply. Only during a call or key operation, that is, in a state in which the processors such as the DSP and the CPU enter a busy operating state and thereby increase their power consumption, the portable telephone terminal operates the DC/DC converter and uses the DC/DC converter as the source of power supply. Power loss when such switching is performed will be examined specifically in the following using equations.

(a) Power Consumption During "Wait"

When it is assumed that the output voltage $V_B$ of the battery 1 (lithium-ion battery) is 3.6 V, the output voltage $V_S$ of the series power supply unit 2 is 1.2 V, and an output current $I_O$A flows from the series power supply unit 2 to the digital unit 6 during a wait, the series power supply unit 2 consumes a power calculated by the following equation:

$$(3.6\ V-1.2\ V)*I_O=2.4I_O[W] \quad (1)$$

In this case, the DC/DC converter 3 is in a nonoperating state, as described above. Therefore, idling current does not flow in the DC/DC converter 3, and thus no power loss occurs in the DC/DC converter 3.

(b) Power Consumption During "Call"

When it is assumed that a current $I_1$A flows from the DC/DC converter 3 to the digital unit 6 during a call and that the efficiency (power conversion efficiency) of the DC/DC converter is 90%, the DC/DC converter 3 causes a power loss of $$I_1*0.1=0.1I_1[W] \quad (2)$$

When the current $I_1$ is supplied by the series power supply unit 2, a power loss in the series power supply unit 2 is obtained by an equation similar to the above equation (1):

$$(3.6\ V-1.2\ V)*I_1=2.4I_1[W] \quad (3)$$

Accordingly, a difference between the power loss when the series power supply unit 2 supplies power to the digital unit 6 and the power loss when the DC/DC converter 3 supplies power to the digital unit 6 is obtained from the above equations (2) and (3):

$$(3.6V-1.2V)*I_1-I_1*0.1=2.3I_1[W] \quad (4)$$

A ratio between the power loss when the series power supply unit 2 supplies power to the digital unit 6 and the power loss when the DC/DC converter 3 supplies power to the digital unit 6 is also obtained from the above equations (2) and (3):

$$(I_1*0.1)/\{(3.6\ V-1.2\ V)*I_1\}=0.1/2.4=1/24(\approx 0.0417) \quad (5)$$

A result obtained by the above equation (5) indicates that during a call, the power supply (battery) can be utilized more effectively when the DC/DC converter 3 is used to supply power to the digital unit 6 than when the series power supply unit 2 is used. The power loss ratio between these supply methods is 1:24, which means that the supply method according to the present embodiment can reduce power loss to 1/24.

As described above, the portable telephone terminal according to the present embodiment has a control mechanism capable of switching the source of power supply to the processors such as the DSP and the CPU from the series power supply to the DC/DC converter power supply when the portable telephone terminal is in a call state or the like and the processors are in a busy operating state and capable of stopping the operation of the DC/DC converter and switching the source of power supply to the processors from the DC/DC converter to the series power supply during a wait. Thus, during the wait, the DC/DC converter stops operating, thereby making it possible to prevent unnecessary power consumption within the converter (unnecessary power consumption by idling operation).

When the processors are in a busy operating condition so that power supply by the series power supply causes unnecessary consumption of power as heat, the source of power supply to the processors is switched to the DC/DC converter. This makes it possible to prevent power from being consumed as heat by the series power supply and thereby utilize electric energy of the battery more effectively than when only the series power supply is used. It is thus possible to conserve power for the whole of the portable telephone terminal.

In addition, as a result of preventing the consumption of power as heat as described above, the electric energy of the battery is not wasted. Therefore, call time of the portable telephone terminal is lengthened, and also the amount of heat generated during a long call can be reduced. This accordingly eliminates the need for a heat sink, for example, which occupies a certain space in the power supply unit, and thereby makes it easier to provide measures to radiate heat in the portable telephone terminal, which is a small apparatus.

During a wait of the portable telephone terminal, the portable telephone terminal according to the present embodiment does not operate the DC/DC converter incorporated therein. Thus, as for wait time, which is measured as performance of the terminal, it is possible to secure the same wait time as that of a conventional terminal. Besides, the overall call time of the portable telephone terminal is longer than that of a conventional terminal employing only a series power supply.

It is to be noted that the present invention is not limited to the embodiment described above and various modifications thereof may be made without departing from the spirit of the present invention.

<First Modification>

The above embodiment uses a timer to generate a delay time $\Delta t$ when the source of power supply to the digital unit 6 is switched from the series power supply unit 2 to the DC/DC converter 3. However, as shown in FIG. 4, a delay block 41 may be provided to delay a control signal by a certain time by hardware.

Figure 4:
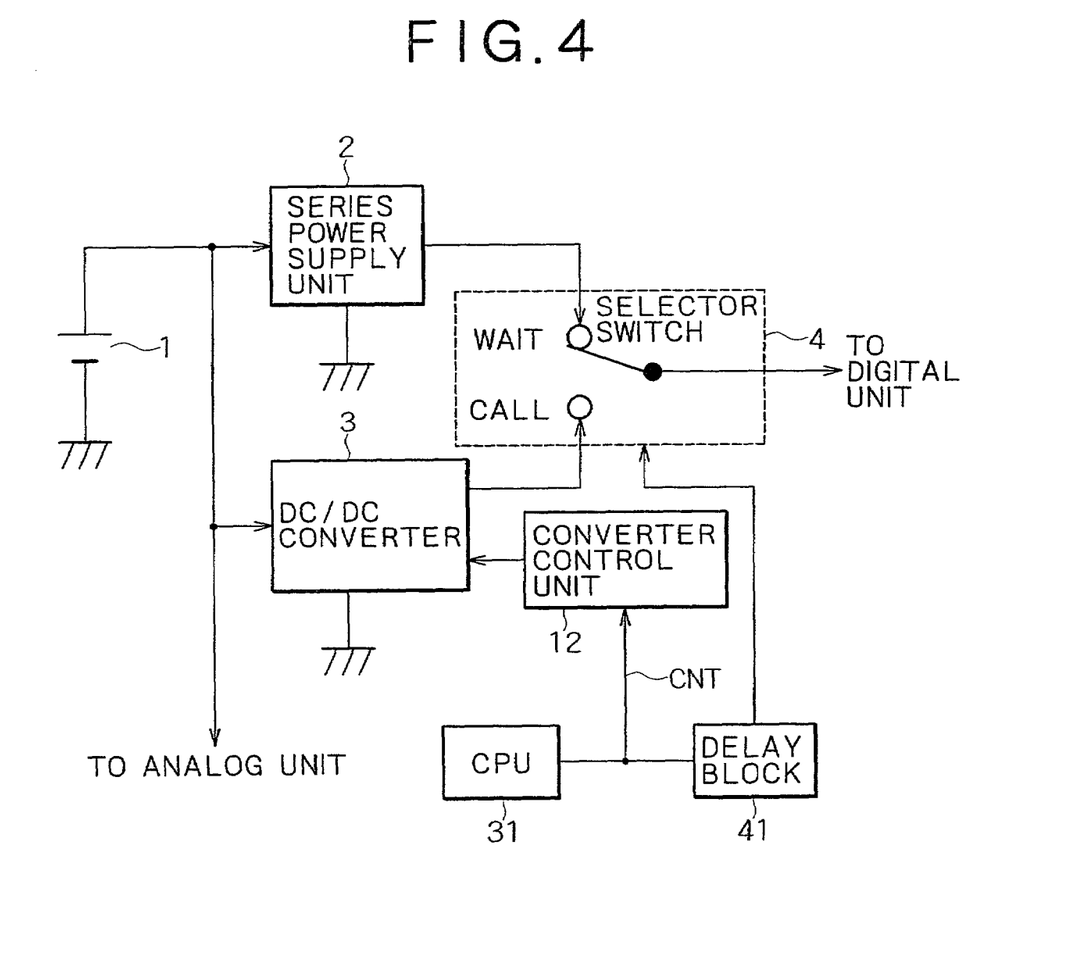
FIG. 4 is a block diagram showing a control for switching a source of power supply according to a first modification.

Specifically, the delay block 41 in FIG. 4 provides a time delay of $\Delta t$ to an input signal and then outputs the signal. In this case, a control signal CNT for switching the source of power supply outputted from a CPU 31 is used as the input signal of the delay block 41. Therefore, the signal CNT is supplied to a selector SW 4 via the delay block 41, and thus control for switching from a series power supply unit 2 to a DC/DC converter 3 is effected with a time delay of Δt.

The signal CNT is directly inputted to a converter control unit 12 of the DC/DC converter 3. Therefore, control of the DC/DC converter 3 is effected without delay. As a result, it is possible to effect control for switching the source of power supply with the same temporal relation as the timing shown in FIG. 3.

<Second Modification>

Figure 5:
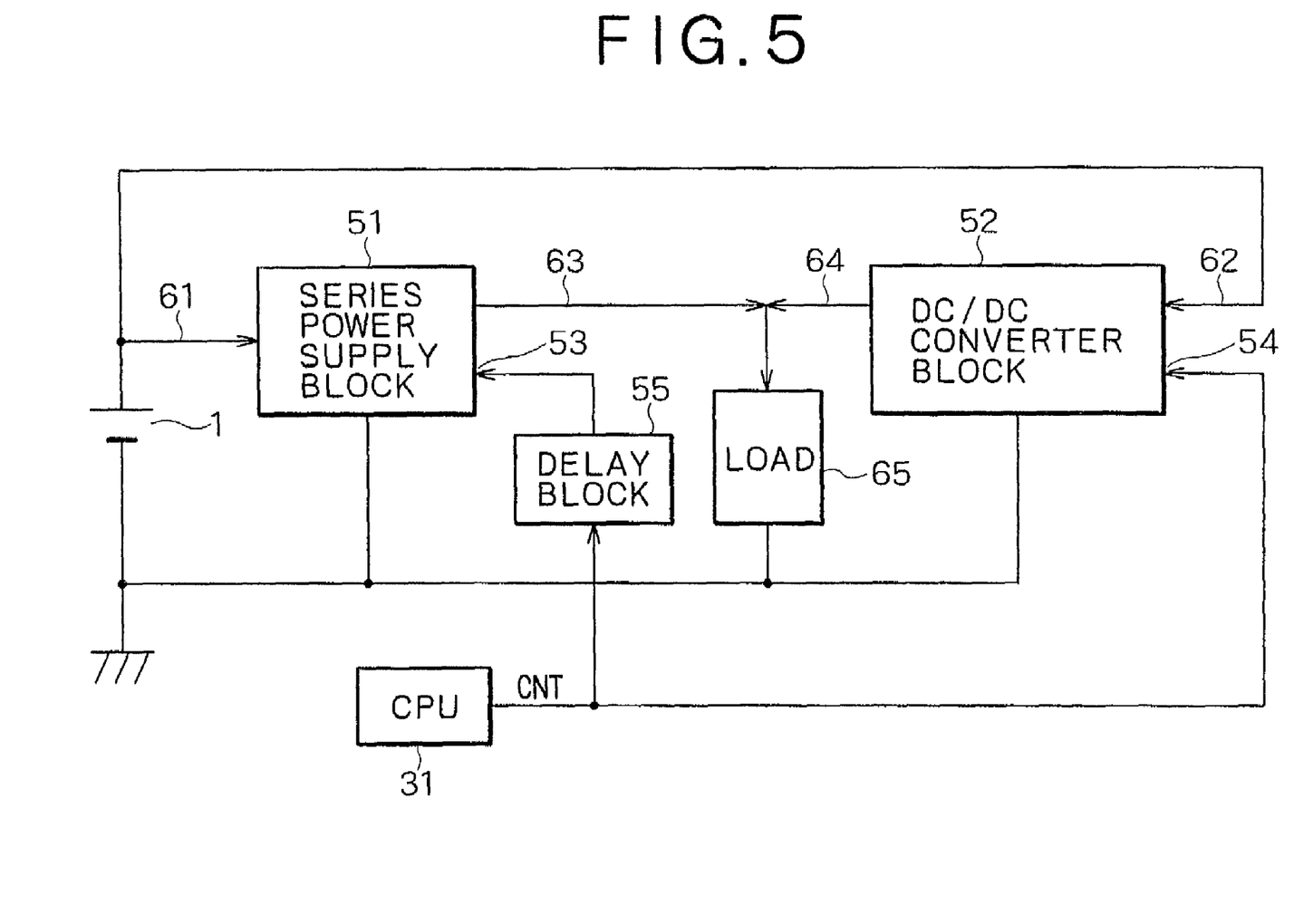
FIG. 5 is a configuration block diagram showing main parts of a portable telephone terminal according to a second modification.

FIG. 5 is a configuration block diagram showing main parts of a portable telephone terminal according to a second modification. The portable telephone terminal effects control for switching the source of power supply using a series power supply and a DC/DC converter each having an output control input terminal. In the figure, the same components as in the portable telephone terminal according to the foregoing embodiment shown in FIG. 1 are identified by the same reference numerals.

As shown in FIG. 5, a series power supply block 51 has an output control input terminal 53, and a DC/DC converter block 52 has an output control input terminal 54. A battery 1 is connected directly to inputs 61 and 62 of the series power supply block 51 and the DC/DC converter block 52, respectively. Power is supplied from outputs 63 and 64 of the series power supply block 51 and the DC/DC converter block 52, respectively, to a load 65.

The load 65 is the same as the digital unit 6 within the portable telephone terminal according to the foregoing embodiment shown in FIG. 1 or an equivalent circuit.

A CPU 31 controls power supply from the series power supply block 51 and the DC/DC converter block 52 to the load 65. Each of the output control input terminals 53 and 54 is controlled by a logic "H" during a wait for communication and a logic "L" during a call. A control signal CNT is directly inputted to the output control input terminal 54 of the DC/DC converter block 52. On the other hand, the control signal CNT is sent to the output control input terminal 53 of the series power supply block 51 via a delay block 55, which provides a time delay Δt to an input signal.

With the above configuration, the portable telephone terminal according to the second modification controls the output of the DC/DC converter block 52 without time delay and controls the output of the series power supply block 51 with a time delay of Δt with respect to that of the DC/DC converter block 52. Thus, the portable telephone terminal can also effect control for switching the source of power supply with the same temporal relation as the timing shown in FIG. 3.

<Third Modification>

According to the foregoing embodiment, the series power supply unit 2 supplies power during the whole of a time period of wait for communication, and the DC/DC converter 3 supplies power during the other time period. This time period of wait may be subdivided as described below.

Specifically, a CPU 31 monitors received radio waves, and effects control for switching the source of power supply so that the series power supply unit 2 supplies power only during a time period other than that of a surrounding-radio-wave monitoring state for monitoring the received radio waves (reception time period state) within the wait time period of the portable telephone terminal and the DC/DC converter 3 supplies power during the other time period.

Such finer control mode for switching the source of power supply enables further reduction in unnecessary power consumption.

It is needless to say that when the DC/DC converter or the DC/DC converter block used in the foregoing embodiment, the first modification, the second modification, and the third modification does not require a rise time before outputting a specified level of voltage, that is, the DC/DC converter or the DC/DC converter block starts power supply at substantially the same time as the input of a starting control signal, the delay time described above does not need to be considered. In this case, the portable telephone terminal shown in FIG. 1 can switch the source of power supply to the digital unit 6 by means of a single control signal from the CPU 31.

As described above, according to the status of operation of the portable telephone terminal, the portable telephone terminal according to the present invention effects control for switching between a first power supply mode in which a first power supply circuit supplies power to a load portion, whose power consumption varies according to the status of operation, and a second power supply mode in which a second power supply circuit supplies power to the load portion. Therefore, the operation of the second power supply circuit is stopped to prevent power consumption within the second power supply circuit during a wait, for example. It is thus possible to effectively utilize the electric energy of the battery incorporated in the portable telephone terminal and thereby conserve power for the whole of the portable telephone terminal.

As a result of preventing the consumption of power as heat by effecting control for switching between the power supply modes according to the status of operation and stopping the operation of the specified power supply circuit, the call time of the portable telephone terminal is lengthened, and also the amount of heat generated during a long call can be reduced. This makes it easier to provide measures to radiate heat in the portable telephone terminal.

In addition, a power supply method according to the present invention comprises the steps of: determining the status of operation; and switching, according to the determined status of operation, between the first power supply mode in which the first power supply circuit supplies power to the load portion, whose power consumption varies according to the status of operation, and the second power supply mode in which the second power supply circuit supplies power to the load portion. Thus, it is possible to provide a power supply method that can effectively utilize the electric energy of the battery and thereby conserve power for the whole of the portable telephone terminal.

What is claimed is:

1. A portable telephone terminal having a load portion and operable to receive a battery unit for supplying operating power, where power consumption varies according to a status of operation of the portable telephone terminal, said portable telephone terminal comprising:

a first power supply circuit arranged so as to be connectable to said battery unit and operable to convert a voltage of said battery unit;

a second power supply circuit arranged so as to be connectable to said battery unit and operable to convert the voltage of said battery unit;

a determining circuit for determining said status of operation of the portable telephone terminal; and a control circuit for effecting control according to said determined status of operation to switch between a first power supply mode wherein said first power supply circuit supplies power to said load portion and a second power supply mode where said second power supply circuit supplies power to said load portion, wherein said control circuit stops a supply of power from said first power supply circuit when a specified time has passed after starting said second power supply circuit.

2. The portable telephone terminal as claimed in claim 1, wherein said control circuit stops said second power supply circuit and starts a supply of power from said first power supply circuit simultaneously.

3. The portable telephone terminal as claimed in claim 1, wherein said status of operation includes at least a call state and a wait state; and switching to said second power supply mode is performed when the portable telephone terminal is in said call state and switching to said first power supply mode is performed when the portable telephone terminal is in said wait state.

4. The portable telephone terminal as claimed in claim 3, wherein switching to said first power supply mode is performed only in a time period when the portable telephone terminal is not in a state of monitoring received radio waves within a period of said wait state and switching to said second power supply mode is performed in another time period.

5. The portable telephone terminal as claimed in claim 1, wherein said first power supply circuit is a series power supply for converting a direct-current input to a direct-current output having a voltage different from that of the direct-current input; and said second power supply circuit is one of self-excited converter and an externally excited converter for converting a direct-current input to a direct-current output having a voltage different from that of the direct-current input.

6. A power supply method for a portable telephone terminal, said portable telephone terminal having a load portion and operable to receive a battery unit for supplying operating power, wherein power consumption varies according to status of operation of the portable telephone terminal, said power supply method comprising the steps of:

converting a voltage of said battery unit by use of a first power supply circuit arranged so as to be coupled to said battery unit;

converting a voltage of said battery unit by use of a second power supply circuit arranged so as to be coupled to said battery unit;

determining said status of operation; and switching, according to said determined status of operation, between a first power supply mode wherein said first power supply circuit supplies power to said load portion and a second power supply mode wherein said second power supply circuit supplies power to said load portion, wherein said switching step includes the steps of:

starting said second power supply circuit;

counting passage of a specified time after said starting of said second power supply circuit; and stopping power supply from said first power supply circuit after said counting is finished.

7. The power supply method as claimed in claim 6, wherein said switching step stops said second power supply circuit and starts power supply from said first power supply circuit simultaneously.

8. The power supply method as claimed in claim 6, wherein switching to said second power supply mode is performed when said portable telephone terminal is in a call state and switching to said first power supply mode is performed when said portable telephone terminal is in a wait state.

9. The power supply method as claimed in claim 8, wherein switching to said first power supply mode is performed only in a time period when said portable telephone terminal is not in a state of monitoring received radio waves within a period of said wait state and switching to said second power supply mode is performed in another time period.

* * * * *